Jan. 27, 1970 R. H. SEIM 3,492,594
D.C. RESTORER AMPLIFIER CIRCUIT
Filed July 11, 1966
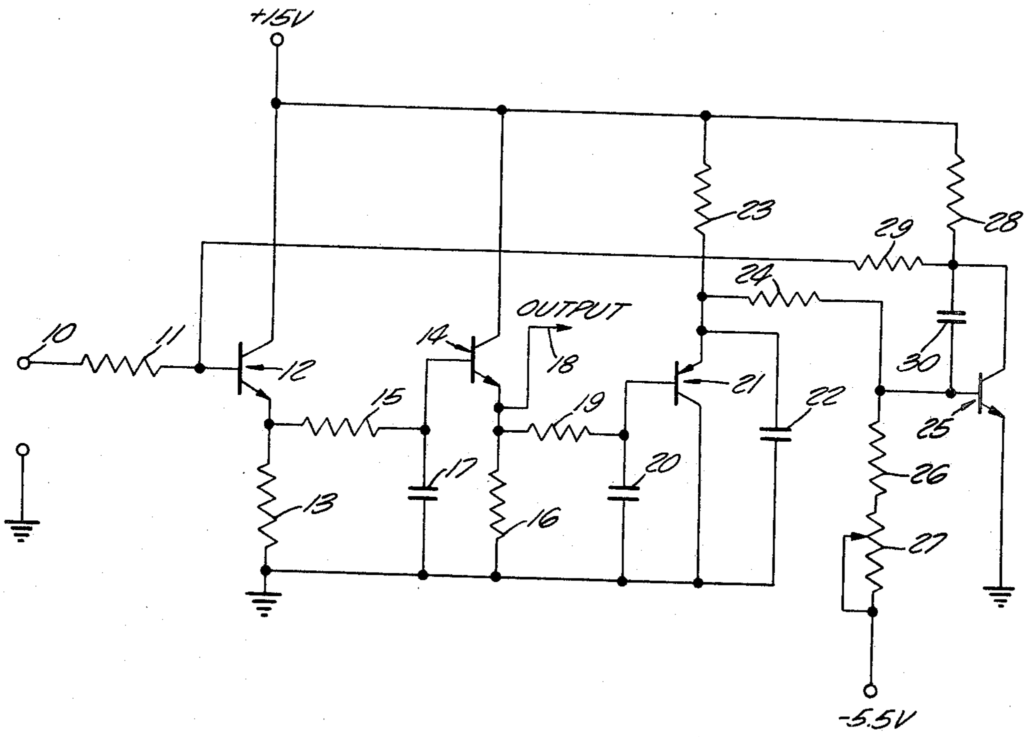
INVENTOR.
ROY H. SEIM
BY Lyon & Lyon
ATTORNEYS 3,492,594
Patented Jan. 27, 1970

3,492,594

D.C. RESTORER AMPLIFIER CIRCUIT

Roy H. Seim, San Diego, Calif., assignor to Cohu Electronics, Inc., San Diego, Calif., a corporation of Delaware Filed July 11, 1966, Ser. No. 564,346
Int. Cl. H03f 1/38, 3/42
U.S. Cl. 330—11 8 Claims

ABSTRACT OF THE DISCLOSURE

A D.C. restored amplifier circuit in which the negative peaks of the output of the amplifier are stored by a capacitor coupled across an emitter follower biased to conduct only on the negative peaks to permit the capacitor to discharge. A feedback circuit senses the voltage across the capacitor and applies a signal to the input of the amplifier to restore the D.C. level.

This invention relates to an amplifier and more particularly relates to an ampifier in which the D.C. level of an A.C. signal is maintained at a desired value.

In U.S. patent application Ser. No. 453,116 filed May 4, 1965 by William R. Tompkins et al., entitled "Video Switching System" and assigned to the assignee of the present application, there is disclosed a system for connecting the output signal from one of a plurality of television cameras to a selected television monitor or group of monitors. One of the features of this system is the provision of a plurality of switch cards each of which includes an isolation amplifier and a plurality of switch points or gating networks for making an initial selection of the camera and monitors to be connected. The details of an amplifier suitable for use as this isolation amplifier are also disclosed, and are claimed, in U.S. patent application Ser. No. 453,146, filed May 4, 1965 by James L. Kimball and William R. Tompkins, entitled "Amplifier" and also assigned to the assignee of the present application.

As discussed in both of those applications, the disclosures of which are incorporated by reference herein, the amplifier is provided with circuitry which serves to maintain its D.C. output voltage level at a constant value. This is accomplished by providing a feedback circuit which has a high gain negative feedback path for D.C. voltage variations but which is essentially out of the circuit for video or other high frequency signals. The D.C. level is determined only by the value of various resistors and an external reference voltage and thus can be adjusted by an external control to any desired value. The amplifier is thus essentially one with two inputs. For D.C., it responds to the reference voltage while for video it responds to the input signal applied to the input terminal of its first stage.

While the system disclosed in the aforementioned patent applications operates in a satisfactory manner, it has been found that in some instances it is desirable to restore the D.C. component to the video signal rather than provide the signal with a constant D.C. output voltage level as done by the amplifier circuit disclosed in the aforementioned applications. Such a restoration insures that there will not be any jump in blanking level when switching between say a 10% average picture level and a 90% average picture level during vertical interval. The signal generated at the camera is provided with a D.C. component so that the pedestals are established at this voltage level. However, this D.C. component is lost during the processing of the signal prior to its insertion into the switch card, and is lost by the input capacitor of the switch card.

It is therefore an object of the present invention to provide an amplifier which inserts a D.C. component into an A.C. signal.

It is also an object of the present invention to provide such an amplifier for restoring to a video signal a D.C. component which had previously been removed therefrom.

It is another object of the present invention to provide a video amplifier which restores a D.C. component to a video signal at the input of the amplifier.

These and other objects and advantages of the present invention will become more apparent upon reference to the accompanying description and drawing, the single figure of which is a schematic diagram of the circuitry of the present invention.

Briefly, the present invention embodies an amplifier whose principle of operation is similar to that disclosed in the aforementioned patent applications but which adds to that amplifier circuitry for restoring a D.C. component to the video signal being amplified. This is accomplished by providing a network which develops a D.C. voltage indicative of the most negative part of the signal, be it sync tips or blanking, and uses this voltage to determine the base current of the transistor in the feedback path so that the D.C. output voltage level of the amplifier is dependent upon this voltage as well as upon the values of the various resistances and the negative reference voltage.

Turning now to the drawing, the signals to be amplified appear at input terminal 10 and are passed through a resistor 11 to the base of an NPN transistor 12 which is connected as an emitter follower. The emitter of the transistor 12 is connected to ground by resistor 13 and to the base of a second NPN transistor 14 by a resistor 15. The transistor 14 is also connected as an emitter follower with its emitter connected to ground through a resistor 16. The base of transistor 14 is coupled to ground through a capacitor 17. The collectors of both of the transistors 12 and 14 are connected to a source of positive potential, for example, plus 15 volts. The output of the transistor 14 appears on the line 18.

The output of the transistor 14 is also connected to a filter comprising resistor 19 and capacitor 20. The output of the filter is applied to the base of PNP transistor 21 which functions as an emitter follower during the most negative part of the signal and is back biased the rest of the time.

The emitter of the transistor 21 is connected to A.C. ground through a capacitor 22 and to the source of positive potential by a resistor 23. The emitter of transistor 21 is also connected by a resistor 24 to the base of an NPN transistor 25. The base of the transistor 25 is also connected to a negative voltage reference source through resistor 26 and variable resistor 27. The emitter of the transistor 25 is grounded and its collector is connected to the source of positive potential through a resistor 28 and to the base of the transistor 12 through a resistor 29. The collector of the transistor 25 is also coupled to its base through a capacitor 30.

In operation, the output of the transistor 14 is passed through the filter 19, 20 to remove unwanted signal components such as the color sub-carrier and is applied to the base of the transistor 21. The transistor 21 is biased so that it functions as an emitter follower only during the most negative part of the signal and is back-biased the rest of the time, that is, its emitter-base junction functions as a diode so that the transistor conducts asymmetrically. The conduction of the transistor 21 during only the most negative part of the signal causes a charge to be maintained on the capacitor 22 which is indicative of the most negative part of the signal, be it sync tips or blanking. The voltage on the capacitor 22 determines the voltage at the emitter of the transistor 21 and thus determines the total voltage developed across the resistors 24, 26 and 27. This total voltage drop of course, is also affected by the setting of the variable resistor 27 and the value of the negative reference applied.

If the average picture level changes, the position of the most negative part of the signal will change. This will change the voltage drop across the resistor 24 which will change the base current of transistor 25. This change will be amplified by the transistor 25 and applied to the base of the transistor 12 causing its conductivity to change. This will in turn cause a change in the conductivity of the transistor 14 causing its D.C. output to return to the desired level, that is, the negative part of the signal is returned to its position before the change in average picture level.

The amplifier thus provided, like the amplifier disclosed in the above-mentioned applications, has a high gain negative feedback path for D.C. voltage variations. The capacitor 30 is provided to make the feedback circuit an integrator so that the voltage is inversely proportional to frequency and the feedback amplifier 23 has high gain only for D.C. variations. The feedback circuit is thus essentially out of the circuit for the video or other high frequency signals that may be applied to the input terminal 10. In the present circuit however, a capacitor and a transistor have been inserted so that the most negative part of the signal is held constant instead of the D.C. level being held constant as in the circuit of the previous applications.

The following component values may be use in constructing a circuit of the type described. It should be understood that these values are illustrative only and not restrictive and could be replaced by other values as will be obvious to those skilled in the art.

| | |
|---|---|
| $R_{11}$ | 120 ohms. |
| $R_{13}$ | 1.5K ohms. |
| $R_{15}$ | 180 ohms. |
| $R_{16}$ | 470 ohms. |
| $R_{19}$ | 1K ohms. |
| $R_{23}$ | 8.2K ohms. |
| $R_{24}$ | 4.7K ohms. |
| $R_{26}$ | 6.2K ohms. |
| $R_{27}$ | 2K ohms. |
| $R_{28}$ | 4.7K ohms. |
| $R_{29}$ | 18K ohms. |
| $C_{17}$ | 24 pf. |
| $C_{20}$ | 390 pf. |
| $C_{32}$ | 1 $\mu$f. |
| $C_{30}$ | .3 $\mu$f. |
| $Q_{12}$ | Type 2N3646. |
| $Q_{14}$ | Type 2N3646. |
| $Q_{21}$ | Type 2N3638. |
| $Q_{25}$ | Type 2N3646. |

Although the foregoing has described the invention in the environment of an isolation amplifier in a video switching system, it should be understood that the invention is equally useful in many other applications and is not to be restricted to either a switching system or to the amplification of video signals. The invention is also not to be restricted to the particular types and polarities of transistors illustrated, these being only exemplary.

I claim:

1. An amplifier for amplifying a video signal and restoring thereto a D.C. level corresponding to the peaks of one polarity of said video signal comprising: first amplifying means having an input and an output; a source of D.C. potential; asymmetrically conductive means having an input electrode and an output electrode connected across said source of potential; bias means connecting said asymmetrically conductive means to said output of said first amplifying means to render said asymmetrically conductive means conductive in response to a signal from said output of said first amplifying means exceeding a preselected value; capacitor means connecting said input electrode of said asymmetrically conductive means to A.C. ground; a reference potential source; means including resistive means connecting said reference potential source to said input electrode of said asymmetrically conductive means; second amplifying means having an input and an output; means for connecting the input of said second amplifying means to an intermediate point on said resistive means; means connecting the output of said second amplifying means to the input of said first amplifying means; and means for supplying said video signal to the input of said first amplifying means whereby a D.C. level is inserted into said video signal.

2. The amplifier of calim 1 wherein said asymmetrically conductive means comprises a transistor having its emitter-collector circuit connected across said source of potential and its base connected to said output of said first amplifying means and wherein said capacitor means and said means including resistive means are connected to the emitter of said transistor.

3. An amplifier for amplifying a video signal and restoring thereto a D.C. level corresponding to the peaks of one polarity of said video signal comprising: amplifying means having an input and an output; a source of D.C. potential; a first transisitor having its emitter-collector circuit connected across said source of potential; biasing means connecting the base of said first transistor to the output of said amplifying means, said biasing means causing said first transistor to conduct only on said peaks; capacitor means connecting said emitter of said first transistor to A.C. ground for storing a signal representative of the peak voltage of said video signal; a reference potential source; means including resistive means connecting said reference potential source to said emitter of said first transistor; a second transistor having its emitter-collector circuit connected across said source of potential; means connecting the base of said second transistor to a point intermediate the ends of said resistive means; means connecting the collector of said second transistor to the input of said amplifying means; and means for supplying said video signal to the input of said amplifying means whereby a D.C. level is inserted into said video signal.

4. The amplifier of claim 3 wherein second capacitor means is connected between the collector and base of said second transistor.

5. The amplifier of claim 3 wherein said means connecting the base of said first transistor to the output of said amplifying means comprises filter means.

6. The amplifier of claim 3 wherein said reference potential source is of opposite polarity to said source of potential.

7. An amplifier for amplifying a video signal and restoring thereto a D.C. level corresponding to the peaks of one polarity of said video signal comprising: amplifying means having an input and an output; a source of D.C. potential; a first transistor; means for connecting said first transistor across said source as an emitter follower; filter and biasing means connecting the base of said first transistor to the output of said amplifying means whereby said first transistor conducts only on said peaks of said video signal; first capacitor means connecting the emitter of said first transistor to A.C. ground for storing a signal representative of the peak voltage of said video signal; a reference potential source of a polarity opposite to said source of potential; means including first and second resistive means connecting said emitter of said first transistor to said reference voltage source, said second resistive means being variable; a second transistor having its emitter-collector circuit connected across said source of potential; means connecting the base of said second transistor to a point intermediate the ends of said first resistive means; second capacitor means connected between the collector and base of said second transistor; means connecting the collector of said second transistor to the input of said amplifying means;

and means for supplying said video signal to the input of said amplifying means whereby a D.C. level is inserted into said video signal.

8. An amplifier for amplifying a video signal and restoring thereto a D.C. level corresponding to the negative peaks of said video signal comprising: a source of positive D.C. potential; first and second NPN transistors; means connecting said first and second transistors between said source of potential and ground as cascaded emitter followers; a PNP transistor; first resistive means connecting the emitter of said PNP transistor to said source of potential; means connecting the collector of said PNP transistor to ground; filter means connecting the base of said PNP transistor to the emitter of said second NPN transistor; first capacitor means connected between said emitter of said PNP transistor and ground; a negative reference potential source; means including second and third resistive means connecting said emitter of said PNP transistor to said reference potential source, said third resistive means being variable; a third NPN transistor; fourth resistive means connecting the collector of said third NPN transistor to said source of potential; means connecting the emitter of said third NPN transistor to ground; means connecting the base of said third NPN transistor to a point intermediate the ends of said second resistive means; second capacitor means connecting the collector of said third NPN transistor to the base thereof; fifth resistive means connecting the collector of said third NPN transistor to the base of said first NPN transistor; and means for supplying said video signal to said base of said first NPN transistor.

References Cited

UNITED STATES PATENTS

| | | | |
|---|---|---|---|
| 2,244,240 | 6/1941 | Blumlein | 330—11 X |
| 2,685,001 | 7/1954 | Darke | 330—139 |
| 2,819,337 | 1/1959 | Keizer | 178—7.3 |
| 3,360,734 | 12/1967 | Kimball et al. | 330—28 X |

NATHAN KAUFMAN, Primary Examiner

U.S. Cl. X.R.

330—19, 26